United States Patent [19]

Takasuga et al.

[11] 4,039,365
[45] Aug. 2, 1977

[54] TIRE COMPONENT TRANSFERRING APPARATUS

[75] Inventors: Yutaka Takasuga, Higashimurayama; Seiichiro Nishimura, Shakujii; Takao Urayama, Higashimurayama, all of Japan

[73] Assignee: Bridgestone Tire Company Limited, Tokyo, Japan

[21] Appl. No.: 641,578

[22] Filed: Dec. 17, 1975

[30] Foreign Application Priority Data

Dec. 25, 1974 Japan .................................. 49-3687
Apr. 2, 1975 Japan .................................. 50-40561

[51] Int. Cl.² ................... B29H 17/20; B29H 17/37
[52] U.S. Cl. ................................ 156/405; 29/235; 156/126; 214/DIG. 3; 269/55
[58] Field of Search ................. 156/123 R, 126, 127, 156/128, 129, 133, 394 R, 396, 405; 214/1 D, DIG. 3; 269/55; 29/235

[56] References Cited

U.S. PATENT DOCUMENTS

| 1,455,260 | 5/1923 | Midgley | 156/126 |
| 2,517,889 | 8/1950 | Kuffler | 156/126 |
| 2,878,857 | 3/1959 | Smith et al. | 156/394 |
| 2,936,813 | 5/1960 | Haase | 156/126 |
| 3,219,510 | 11/1965 | Frazier | 156/127 |
| 3,413,174 | 11/1968 | Porter | 156/405 |
| 3,531,355 | 9/1970 | Riddle | 156/394 |
| 3,909,335 | 9/1975 | Jellison | 156/127 |
| 3,909,336 | 9/1975 | Takahashi et al. | 156/126 |

FOREIGN PATENT DOCUMENTS

| 1,237,300 | 3/1967 | Germany | 156/126 |
| 1,181,901 | 11/1964 | Germany | 156/394 |

*Primary Examiner*—Charles E. Van Horn
*Assistant Examiner*—John E. Kittle

[57] ABSTRACT

Herein disclosed is an apparatus for removing and mounting a tire component from and onto a collapsible building drum which is in a collapsed state. The apparatus comprises a truck movable toward and away from a collapsible building drum, drive means mounted on the truck to move the truck toward and away from the building drum, an upstanding post assembly mounted on the truck, a pair of tire component supporting rods mounted on the upstanding post assembly to be revolvable around the circumferential outer surface of the building drum for removing and mounting a tire component from and onto the tire building drum held in a collapsed state, and revolving means mounted on the upstanding post assembly to revolve the tire component supporting rods around the circumferential surface of the building drum.

15 Claims, 18 Drawing Figures

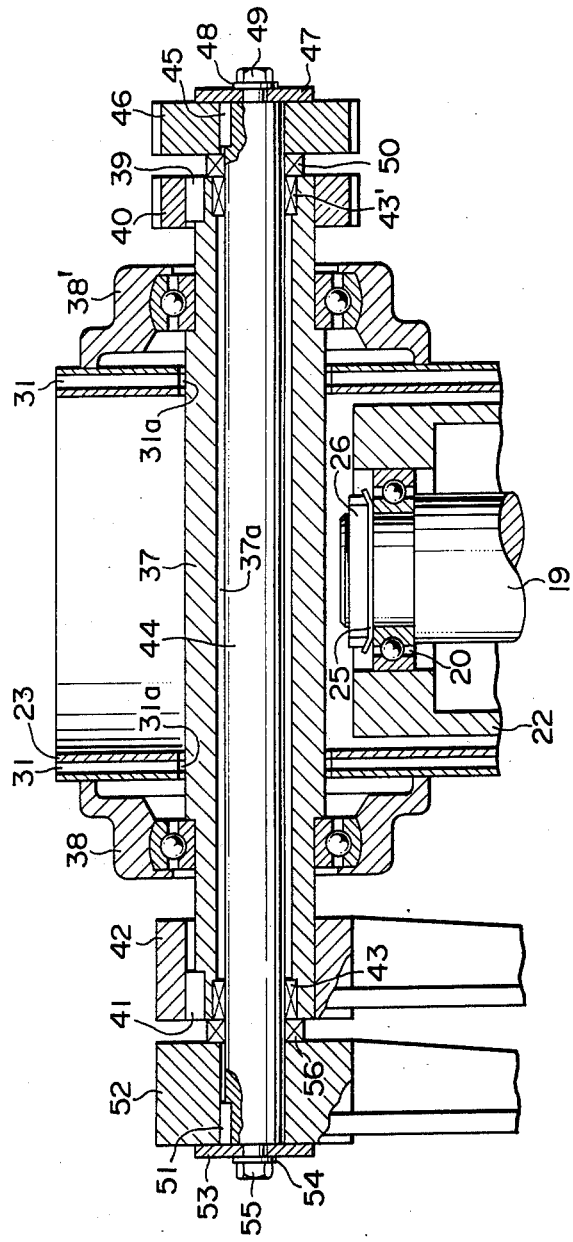
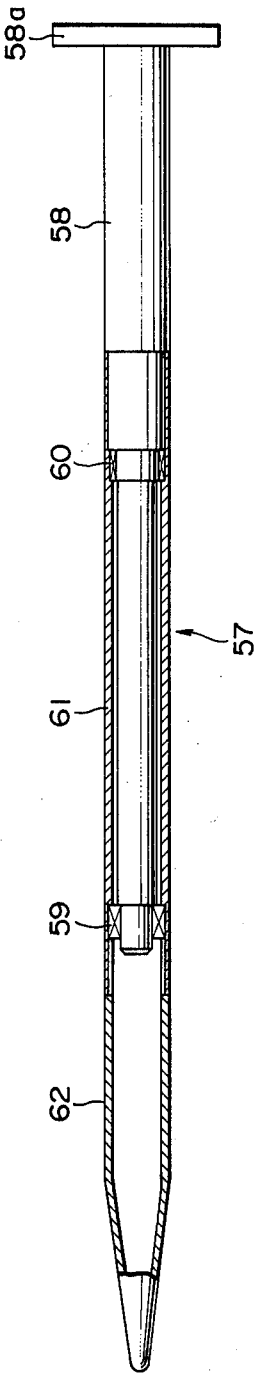
FIG. 5
FIG. 6

TIRE COMPONENT TRANSFERRING APPARATUS

The present invention relates to a tire component transferring apparatus and, more particularly, to an apparatus for removing and mounting a tire component from and onto a collapsible building drum which is in a collapsed state.

Conventionally, it is common practice in a tire band building operation to remove a finished tire band out of the tire band building drum and then to load it onto a band truck which is thereafter forwarded to a tire building drum for transferring thereto. The above removal and loading operation was required to be performed by only one attendant operator in addition to a tire band building operation in which a continuous rubberized cord fabric ply is wound around the tire building drum in two or three folds and cut to a predetermined length. The removal and loading operation is an extremely laborious and tiresome task and requires a relatively long time. For this reason, there is low production efficiency and high cost for a finished tire.

It is, therefore, an object of the present invention to eliminate such drawbacks in the prior art and to provide an apparatus suitable for transferring the tire band from the tire band building drum onto the tire building drum which will provide increased production efficiency and contribute to elimination of the laborious and tiresome operation which has thus far been necessitated in the tire band transferring operation.

In accordance with the present invention, there is provided, to accomplish such an object, an apparatus which comprises: a truck movable toward and away from a collapsible building drum; drive means mounted on the truck to move the truck toward and away from the building drum; an upstanding post assembly mounted on the truck; a pair of tire component supporting rods mounted on the upstanding post assembly to be revolvable around the circumferential outer surface of the building drum for removing and mounting a tire component from and onto the tire building drum held in a collapsed state; revolving means mounted on the upstanding post assembly to revolve the tire component supporting rods around the circumferential surface of the building drum.

The features and advantages of the apparatus in accordance with the present invention will become more apparent from the following description taken in conjunction with the accompanying drawings, in which:

FIG. 5 is an enlarged fragmentary cross-sectional view of the upper portion of the upstanding post assembly;

FIG. 6 is an enlarged fragmentary cross-sectional view of the tire band supporting rod;

Figure 1D:
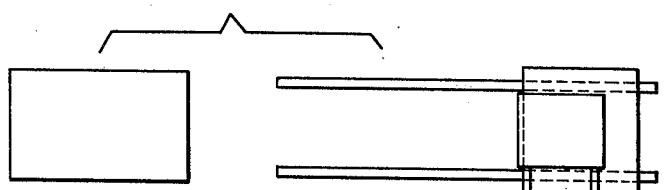
FIGS. 1a to 1d are diagrammatic plan views of a first embodiment of the apparatus in accordance with the present invention and show different operating stages of transferring a tire band from a tire band building drum onto a pair of tire band supporting rods on a truck.
Figure 1A:
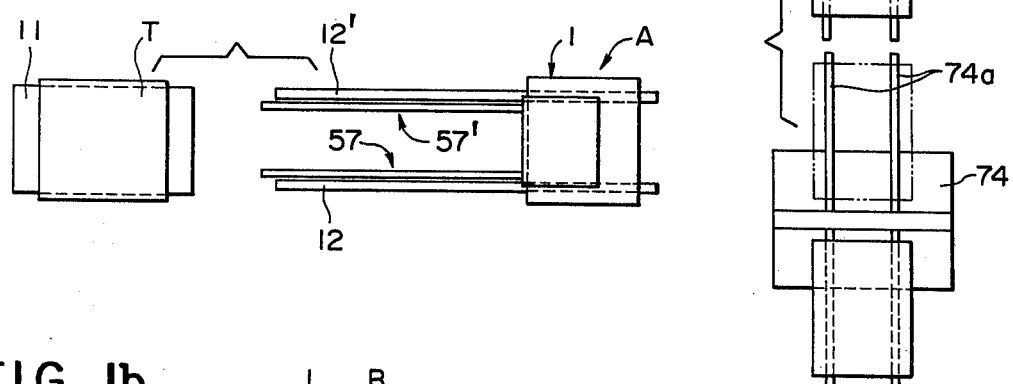
Figure 1B:
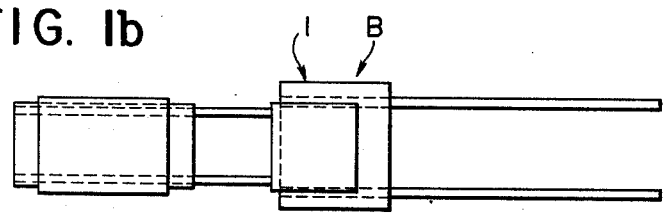
Figure 1C:
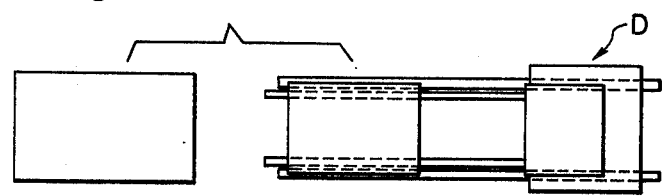
Figure 2:
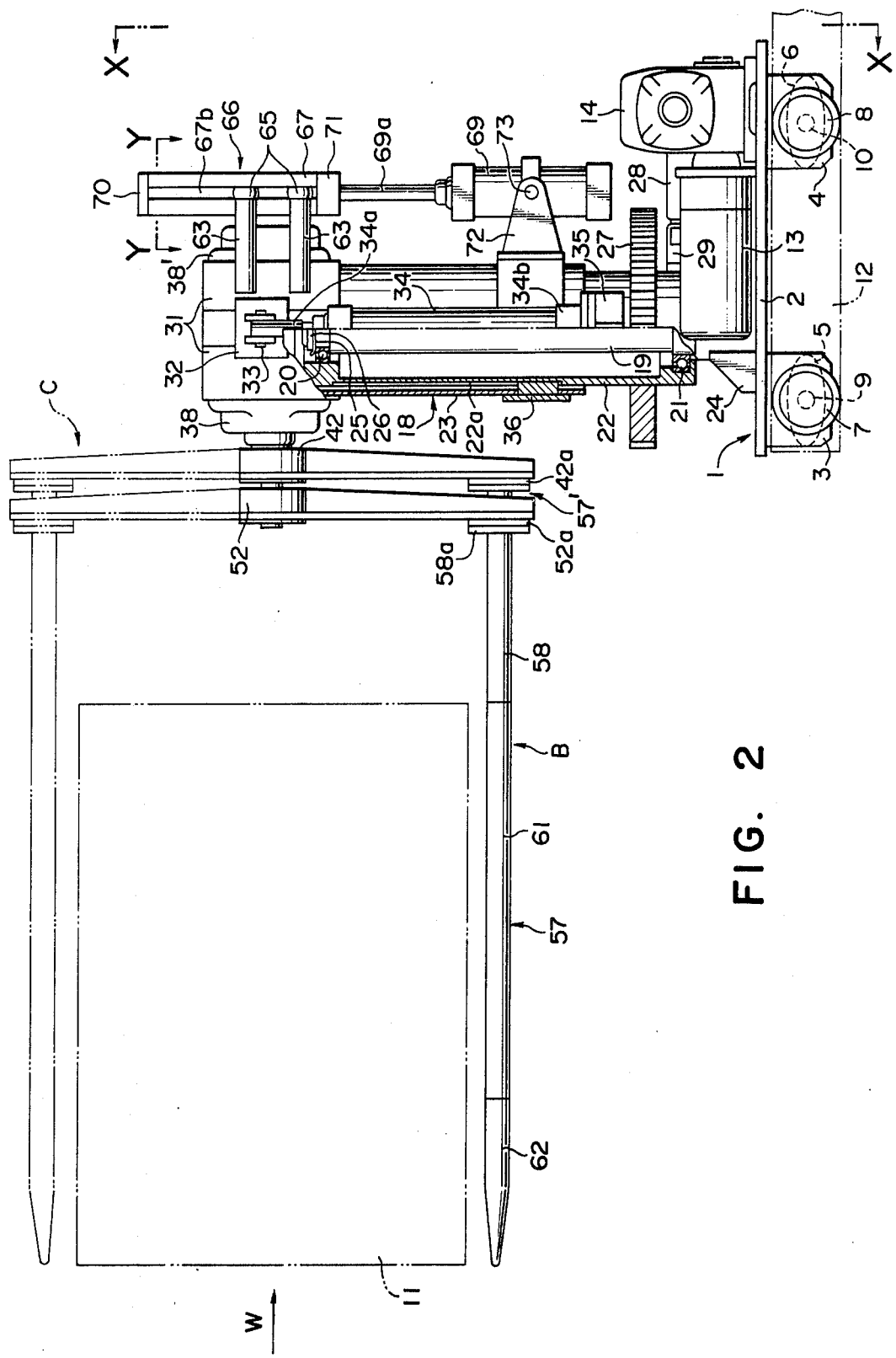
FIG. 2 is a side elevational view, partly in section, of the first embodiment.
Figure 3:
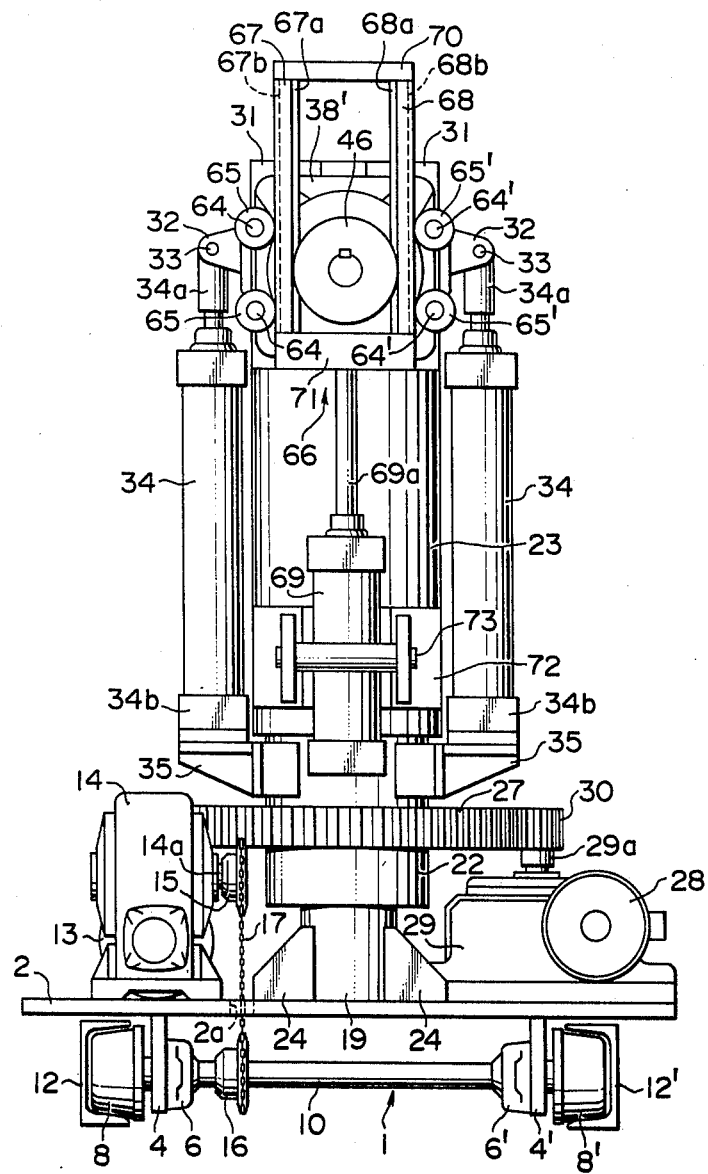
FIG. 3 is a rear elevational view of the first embodiment as seen from the lines X—X in FIG. 2.

As shown in FIGS. 2 and 3, a truck generally shown at 1 includes a base member 2, a pair of front brackets 3 and 3' depending from the front lower surface of the base member 2 in opposing relation with each other, the brackets 3' not being shown in the drawings, and a pair of rear brackets 4 and 4' depending from the rear surface of the base member 2 in opposing relation with each other. On the inner surfaces of the front brackets 3 and 3' are securely mounted front bearings 5 and 5', respectively, the latter of which is not shown in the drawings, while the rear bearings 6 and 6' are also securely mounted on the inner surfaces of the rear brackets 4 and 4'. A front rotary shaft 9 is rotatably mounted at both end portions on the front bearings 5 and 5' and carries at both ends a pair of front wheels 7 and 7' the latter of which is not shown in the drawings. Similarly, a rear rotary shaft 10 is rotatably mounted at both end portions on the rear bearings 6 and 6' and carries at both ends a pair of rear wheels 8 and 8'. The front and rear wheels 7, 7', 8 and 8' are adapted to be rotatably engaged with parallel spaced guide rails 12 and 12' which are located on a horizontal floor in parallel to the rotational axis of a tire band building drum 11 (see FIGS. 1a to 1d). On the base member 2 are mounted an electric motor 3 and a reduction gear unit 14 which are in driving connection with each other in a usual manner. An output shaft 14a of the reduction gear unit 14 carries a sprocket wheel 15 which have a driving connection through an endless chain 17 with a sprocket wheel 16 which is carried by the rear rotary shaft 10. A bore 2a is formed in the base member 2 to allow the endless chain 17 to pass therethrough. When the electric motor 13 is energized to rotate the rear wheels 8 and 8' through the reduction gear unit 14, the sprocket wheel 15, the endless chain 17, the sprocket wheel 16 with the front wheels 7 and 7' being freely rotated, the truck 1 runs along the guide rails 12 and 12' so that the truck 1 is movable between first and second operating positions A and B as shown in FIGS. 1a and 1b. An upstanding post assembly generally shown at 18 includes a stationary post 19 substantially vertically and securely mounted on the central portion of the base member 2, an inner cylindrical member 22 turnably mounted on the stationary post 19 through upper and lower bearings 20 and 21, and an outer cylindrical member 23 substantially vertically slidably engaged with the inner cylindrical member 19. Four reinforcing plates 24 are equiangularly disposed to rigidly connect the stationary post 19 and the base member 2, and the upper bearing 20 is attached to the upper portion of the stationary post 19 by means of a lock nut 26 and a washer 25 as particularly shown in FIG. 5. On the lower outer periphery of the inner cylindrical member 22 is securely mounted a spur gear 27 which is meshed with a gear 30 carried on an output shaft 29a of a reduction gear unit 29. An electric motor 28 is mounted on the base member 2 in opposing relation to the electric motor 13 so as to be drivably associated with the reduction gear unit 29. The number of rotation of the electric motor 28 is previously set to turn the inner and outer cylindrical members 22 and 23 by 90° so that the electric motor 28 is automatically stopped upon completion of the number of rotation. When the electric motor 28 is thus energized to rotate the inner and outer cylindrical members 22 and 23 by 90° through the reduction gear unit 29 and the gears 30 and 27, the inner and outer cylindrical members 22 and 23 are turnable between fourth and fifth operating positions D and E as shown in FIGS. 1c and 1d. The turn angle of the inner and outer cylindrical members 22 and 23 is not limited to 90° and thus is appropriately selected by previously setting the number of rotation of the electric motor 28.

On the upper periphery of the outer cylindrical member 23 are equi-distantly attached four L-shaped member 31 to provide four vertical plates whose adjacent two plates are substantially at right angles to each other. In other words, each of the L-shaped members 31 has a first vertical plate parallel to the axis of the tire band building drum 11 and a second vertical plate at right angles to the axis of the tire band building drum 11. The first plates of the adjacent two L-shaped members 31 are rigidly connected at their central portions by an upper bracket 32 which is, in turn, pivotally connected to a piston rod 34a of an air cylinder 34 through a pivotal pin 33. The lower ends 34a of the air cylinders 34 are securely mounted on brackets 35 attached to the lower side surfaces on the inner cylindrical member 22. On the periphery of the inner cylindrical member 22 is formed a guide groove 22a, along the axis of the stationary rod 19, which is held in sliding engagement with a guide member 36 attached to the outer cylindrical member 23 so as to allow the outer cylindrical member 23 to turn in unison with the inner cylindrical member 22 around the axis of the stationary rod 19 as well as to permit the outer cylindrical member 23 to slide on the inner cylindrical member 22 along the axis of the stationary rod 19. Therefore, the simultaneous actuation of the air cylinders 34 enables the outer cylindrical member 23 to slidingly move between a fifth operating position E as shown in solid lines and a sixth operating position as shown in phantom lines F in FIG. 4.

As shown in FIG. 5, a first shaft 37 which has a bore 37a extending throughout the length thereof is inserted through bores 31a formed in the second plates of the L-shaped members 31 and is horizontally and rotatably supported by bearings 38 and 38' which are attached to the second plates of the L-shaped members 31 in opposing relation with the bores 31a. A pinion gear 40 is rigidly mounted through a key member 39 on one end of the first shaft 37 whose the other end is rigidly connected to a swing arm 42 through a key member 41. A second shaft 44 is inserted throughout the bore 37a to have outwardly extending ends and rotatably supported by bearings 43 and 43' attached to the both inner peripheral ends of the first shaft 37. A pinion gear 46 is rigidly mounted through a key member 45 on one end of the second shaft 44 and retained by means of a ring 47, a washer 48 and a nut 49. A bearing 50 is interposed on the second shaft 44 between the pinion gears 40 and 46 to decrease frictional resistance between the pinion gears 40 and 46 upon relative rotation therebetween. A swing arm 52 is rigidly mounted through a key member 51 on the other end of the second shaft 44 and retained by means of a ring 53, a washer 53 and a nut 55. On the second shaft 44 between the swing arms 42 and 52 is interposed a bearings 56 which also serves to decrease frictional resistance between the swing arms 42 and 52 upon relative rotation therebetween.

Referring again to FIG. 2, tire band supporting rods generally shown at 57 and 57' are horizontally attached to the free ends of the swing arms 42 and 52, respectively, through flange members 42a and 52a, respectively. Since the tire band supporting rods 57 and 57' are substantially the same in their construction in exception that the supporting rod 57' is somewhat longer than the supporting rod 57, only the supporting rod 57 will be described hereinafter in greater detail with reference to FIG. 6. The tire band supporting rod 57 includes a fixed shaft 58 having a rear end with a flange member 58a rigidly connected to the flange member 52a at the free end of the swing arm 52, a rotary sleeve 61 rotatably supported by the fixed shaft 58 through bearings 59 and 60, and a cap 62 rigidly connected to the forward end of the rotary sleeve 61 for facilitating its insertion through a tire band on the tire band building drum 11 in a collapsed state. The tire band supporting rod 57' has a fixed shaft made longer than the fixed shaft 58 by a space between the swing arms 42 and 52 in a direction parallel to the axis of the first shaft 37 as particularly shown in FIG. 2.

In FIGS. 2 and 3, projections 63 and 63' are securely mounted on the first plates of the rear L-shaped members 31 in opposing relation with each other but the latter projections 63 are not shown in the drawings. The projections 63 and 63' are adapted to rotatably carry guide rollers 65 and 65', respectively, at the rear ends thereof through pin members 64 and 64', respectively. A tire band supporting rods revolving mechanism is shown generally at 66 in FIGS. 2 to 4, 5 and 7 including a slide rack 67 meshed with the pinion gear 40, a slide rack 68 also meshed with the pinion gear 46, and an air cylinder 69 for vertically moving the slide racks 67 and 68. The slide racks 67 and 68 are rigidly connected at their upper and lower ends by upper and lower members 70 and 71, respectively, to make the slide racks 67 and 68 in parallel relation with each other. An air cylinder 69 has a piston rod 69a, whose leading end rigidly connected to the lower surface of the lower member 71, and is pivotally mounted through a pin member 73 on brackets 72 which are attached to the lower peripheral wall of the outer cylindrical member 23. The slide rack 67 has teeth 67a at the opposing face to the pinion gear 40 and is formed flat at the opposing remaining face to the pinion gear 46. Likewise, the slide rack 68 has teeth 68a at the opposing face to the pinion gear 46 and is formed flat at the remaining opposing face to the pinion gear 40. Guide grooves 67b and 68b are longitudinally formed on the outer walls of the slide racks 67 and 68, respectively, to engage and guide the guide rollers 65 and 65' rotatably mounted on the projections 63. When the air cylinder 69 is thus actuated to cause the piston rod 69a to retract downwardly under the condition as shown in FIGS. 2 and 3, the slide racks 67 and 68 are moved downwardly so that the pinion gear 40 having meshing relation with the slide rack 67 is rotated in a counterclockwise direction in FIG. 3 whereas the pinion gear 46 having meshing relation with the slide rack 68 is rotated in a clockwise direction in FIG. 3. Such rotations of the pinion gears 40 and 46 are transmitted to the first and second shafts 37 and 44 so that the swing arm 42 is caused to swing in a clockwise direction as seen from an arrow W in FIG. 2 while the swing arm 52 is caused to swing in a counterclockwise direction as seen from the arrow W in FIG. 2. The portions to support a tire band, i.e., the rotary aleeves 61 and the caps 62 of the tire band supporting rods 57 and 57' are rotated around their own axes, i.e., the fixed shafts 58 while being revolving around the axis of the second shaft 44 so that they are revolvable between a second operating position B as shown in solid lines in FIG. 2 and a third operating position C as shown in phantom lines in FIG. 2.

The operation of removing a tire band in the apparatus thus constructed and arranged will now be described with reference to FIGS. 1 to 7.

Figure 4:
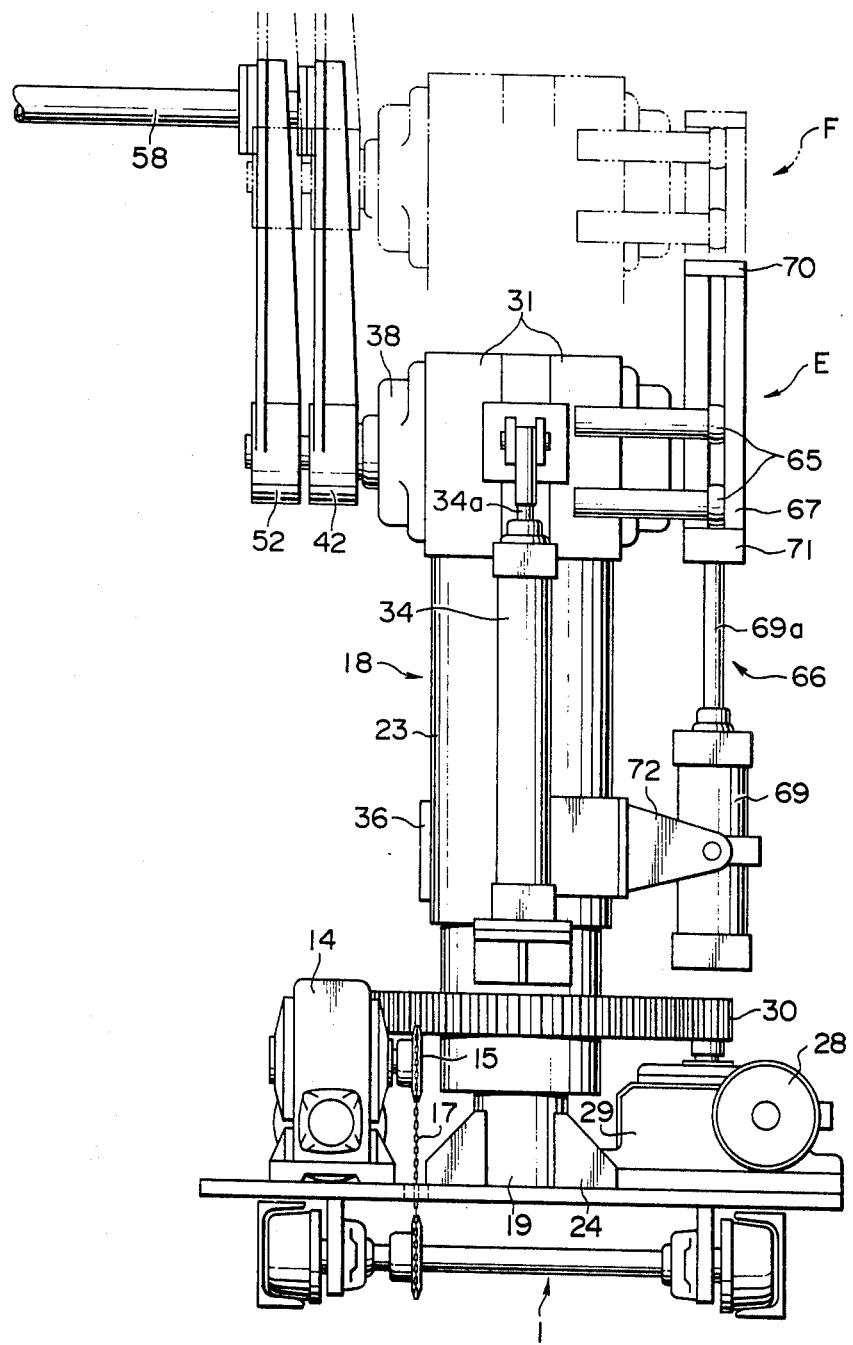
FIG. 4 is a fragmentary side elevational view of the first embodiment and shows an upstanding post assembly in a raised condition in phantom lines.
Figure 7:
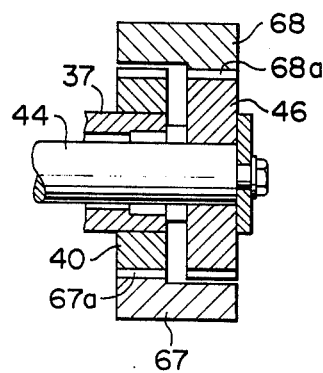
FIG. 7 is an enlarged cross-sectional view taken on lines Y—Y in FIG. 2.
Figure 8:
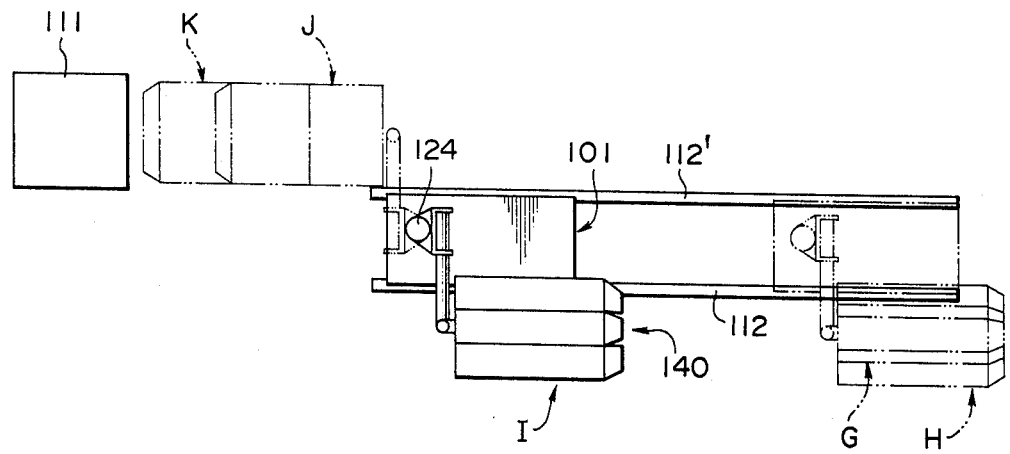
FIG. 8 is a diagrammatic plan view of a second embodiment of the apparatus in accordance with the present invention and shows different operating stages of the second embodiment.

A predetermined number of rubberized cord fabric plies are wrapped around the outer peripheral wall of the tire band building drum 11 is an expanded state to build a tire band T and thereafter the building drum 11 is collapsed, whereupon the tire band T dangles on the building drum 11 to produce a small gap between the inner surface of the tire band T and the lower surface of the tire band building drum 11. When such a collapsing operation of the building drum 11 is completed, the electric motor 13 is energized to start its rotation so that the rear wheels 8 and 8' are rotated through the reduction gear unit 14, the sprocket wheel 15, the endless chain 17, the sprocket wheel 16 and the rotary shaft 9, thereby causing the front wheel 3 and 3' to rotate and forcing the truck 1 to run along the guide rails 12 and 12' toward the tire band building drum 11. The truck 1 is thus moved from the first operating position A as shown in FIG. 1a to the second operating position B as shown in FIG. 1b and in solid lines in FIG. 2. As the truck 1 assumes a final stage of the second operating position B, the tire band supporting rods 57 and 57' are inserted through the gap formed between the lower inner surface of the tire band T and the lower outer peripheral wall of the tire band building drum 11 held in a collapsed state. When the truck 1 has been moved into the second operating position B, the air cylinder 69 is actuated to cause the piston rod 69a to retract downwardly so that the supporting rod 57 is revolved around the circumferential surface of the tire band building drum 11 in a counterclockwise direction as seen from the arrow W in FIG. 2 and the supporting rod 57' is simultaneously revolved around the circumferential surface of the tire band building drum 11 in a clockwise direction as seen from the arrow W in FIG. 2 through the transmission process which has been previously described. The tire band supporting rods 57 and 57' thus assume the secon operating position B as shown in solid lines in FIG. 2 to the third operating position C as shown in phantom lines in FIG. 2. At the present stage, the rotary sleeves 61 ans the caps 62 of the supporting rods 57 and 57' are jointly rotated about their own axes while being in close contact with the inner peripheral surface of the tire band T as particularly shown in FIG. 6. Resulting from the revolutions of the tire band supporting rods 57 and 57' up to the third operating position C, the tire band T is supporting or held at its inner peripheral surface by means of the supporting rods 57 and 57' so that the tire band T is transferred to the supporting rods 57 and 57' from the tire bnd building drum 11. Upon the supporting rods 57 and 57' assuming the third operating position C, the electric motor 13 again starts to rotate but in a reverse direction so that the truck 1 is driven by the rear wheels 8 and 8' to run along the guide rails 12 and 12' to be separated from the tire band building drum 11. The truck 1 is thus moved from the third operating position C as shown in phantom lines in FIG. 2 to the fourth operating position D as shown in solid lines in FIG. 1c. The revolutions of the tire band supporting rods 57 and 57' together with movement of the truck 1 brings about an automatic removal of the tire band T without necessitating any human labour. After the truck 1 arrives at the fourth operating position D, the electric motor 28 is initiated to rotate so that the inner cylindrical members 22 and 23 are turned by 90° through the reduction gear unit 29 and the gears 30 and 27, thus causing the tire band supporting rods 57 and 57' to be turned from the fourth operating position D as shown in FIG. 1c to the fifth operating position E as shown in FIG. 1d while the supporting rods 57 and 57' are held in the raised condition as shown in solid lines in FIG. 4. Then, the air cylinders 34 are actuated to cause the piston rods 34a to project upwardly so that the outer cylindrical member 23 is vertically raised and the tire band supporting rods 57 and 57' are moved at the fifth operating position E as shown in FIG. 1d to the sixth operating position F as shown in phantom lines in FIG. 4. Upon movement of the tire band supporting rods 57 and 57' to the sixth position F, the supporting rods 57 and 57' assume substantially the same height to a pair of receiving members 74a mounted on a tire band receiving truck 74 disposed in close proximity of the forward ends of the supporting rods 57 and 57' as shown in FIG. 1d. When the supporting rods 57 and 57' and the receiving members 74a have been coincided in height, the tire band T is removed from the supporting rods 57 and 57' and transferred to the receiving members 74a by an attendant operator. Upon completion of transferring the tire band T to the receiving members 74a of the tire band receiving truck 74, the electric motor 28 is again energized to rotate in a reverse direction and the air cylinders 34 and 69 are again reversely actuated so that the tire band supporting rods 57 and 57' reassume the first operating position A as shown in FIG. 1a from the sixth operating position F in phantom lines as shown in FIG. 4.

A single and complete cycle of operation to remove a tire band T from the tire band building drum 11 and to transfer it to the tire band receiving truck 74 has been previously described. A number of such transferring operations will be repeated in the previously described first embodiment of the apparatus embodying the present invention.

Assuming that the electric motors, 13, 28 and the air cylinders 34, 69 are operated in accordance with a previously set program, the first embodiment of the present invention may be operated in a completely automated fashion.

While it has been described that the upstanding post assembly 18 is turnably mounted on the truck 1 and thus turned by the electric motor 28 to turn the tire band supporting rods 57 and 57' by 90°, thereby moving them into face-to-face relation with the receiving members 74a on the truck 74, the tire band supporting rods 57 and 57' may be moved only in a direction parallel to the axis of the tire band building drum 11 to allow the tire band receiving members 74a on the truck 74 to move into face-to-face relation with the supporting rods 57 and 57 ' when the truck 1 is moved away from the tire band building drum 11 so that the tire band T can be transferred from the supporting rods 57 and 57' to the receiving members 74a without runing the supporting rods 57 and 57'. In this instance, the turnable upstanding post assembly 18 and a turning mechansim to turn the upstanding post asssembly 18 are not necessitated. On the other hand, it has been described that air cylinders 34 ar provided to coincide the levels between the supporting rods 57, 57' on the truck 1 and the receiving members 74a on the truck 74, however, the outer cylindrical member 23 may be fixed to the inner cylindrical member 22 to raise the truck 74 by a suitable lifting mechanism to coincide the levels between the supporting rods 57, 57' and the receiving members 74a for facilitating transfer of the tire band T, where desired. According to the first embodiment of the present invention, the truck 1 which has the supporting rods 57 and 57' supporting the tire band T may be directly advanced to a tire building drum onto which the tire band T is transferred from the supporting rods 57 and 57' so as to assemble it with a tread and tire beads for production of a green tire. In place of direct advancement of the truck 1 to the tire building drum, a following additional truck may be employed to store the tire band T for a short period of time and to prevent the fabric cords of the tire band T from being disarranged. The construction and arrangement of such a truck will now be described hereinafter in greater detail as a second embodiment of the present invention with reference to FIG. 8 to 15.

Figure 9:
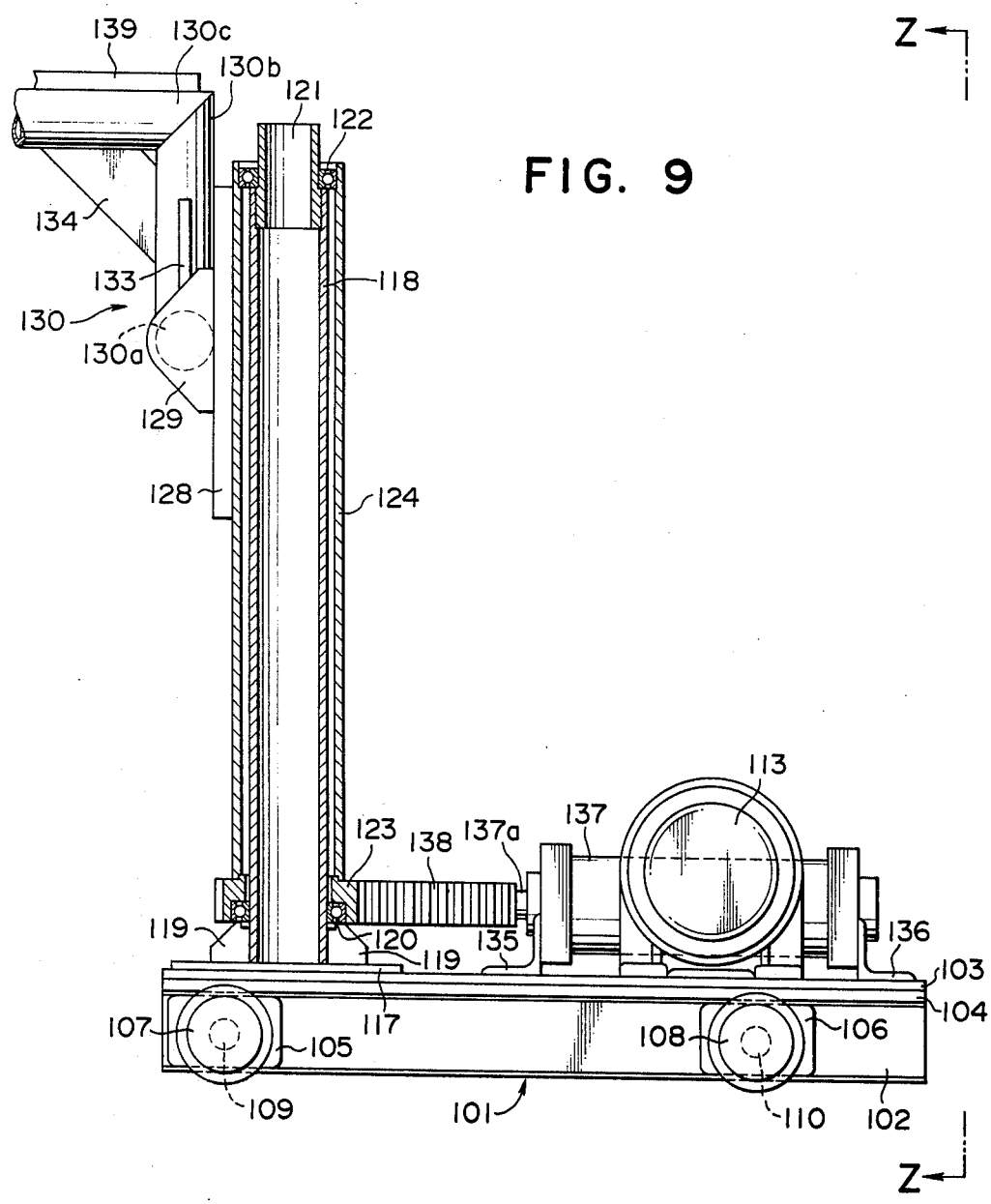
FIG. 9 is a fragmentary side elevational view, partly in section, of the second embodiment.
Figure 10:
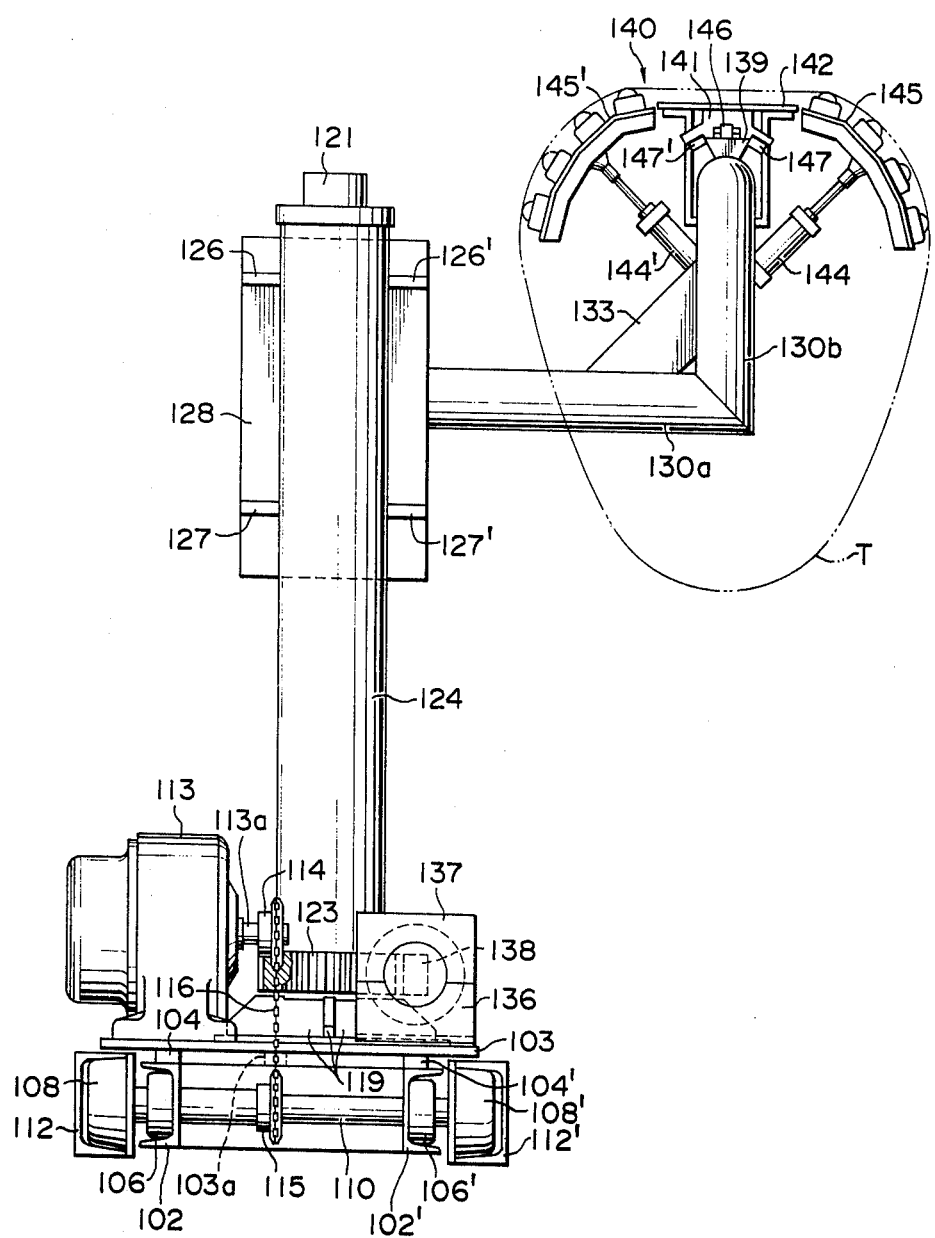
FIG. 10 is a rear view of the second embodiment as seen from lines Z—Z in FIG. 9.

As particularly shown in FIGS. 9 and 10, an additional truck generally designated at 101 includes a base member 103 and a pair of parallel spaced channel members 102 and 102' depending from and rigidly connected to the lower surface of the base member 103 through intermediate members 104 and 104', respectively. A front rotary shaft 109 carries a pair of front wheels 107 and 107' at both ends thereof and is rotatably supported on bearings 105 and 105' which are fixed to the front outer faces of the channel members 102 and 102', respectively. The front wheel 107' and the bearing 105' are not shown in FIGS. 9 and 10, but are disposed opposingly to the front wheel 107 and the bearing 105, respectively. A rear rotary shaft 110 also carries a pair of rear wheels 108 and 108' at both ends thereof and is rotatably supported on bearings 106 and 106' which are secured to the rear outer faces of the channel members 102 and 102', respectively. The front wheels 107, 107' and the rear wheels 108, 108' are adapted to be guided by parallel spaced rails 112 and 112', respectively, which are located on a horizontal floor and extend to a position adjacent the tire building drum 111 in parallel relation with the axis of the building drum 111 (see FIG. 8). On the rear portion of the base member 103 is mounted an electric motor 113 whose output shaft 113a carries thereon a sprocket wheel 114. The sprocket wheel 114 has a driving connection with a sprocket wheel 115 which is securely mounted on the rear rotary shaft 110 through an endless chain 116 passed thereover. The base member 103 is formed with a bore 103a through which the endless chain 116 is passed. When the electric motor 113 is thus energized to rotate, the rear wheels 108 and 108' are caused to rotate through the sprocket wheel 114, the endless chain 116, the sprocket wheel 115 and the rear rotary shaft 110 while the front wheels 107 and 107' are freely rotated. Therefore, the truck 101 is movable along the rails 112 and 112' between an eighth operating position H as shown in phantom lines in FIG. 8 and a nineth operating position I as shown in solid lines in FIG. 8. On the front portion of the base member 103 is mounted a plate 117 on which a stationary post 118 is substantially vertically mounted. The stationary post 118 is rigidly connected to the plate 117 by four reinforcing plates 119 which are equi-angularly disposed around the lower end of the stationary post 118. A pinion gear 123 is rotatably supported on the lower end portion of the stationary post 118 by means of a bearing 120. A cylindrical member 124 has a lower end rigidly supported on the pinion gear 123 and an upper end rotatably connected through a bearing 122 to a sleeve 121 which is retained by the upper end of the stationary post 118 so that the cylindrical member 124 is rotatably received by the stationary post 118. On the upper portion of the cylindrical member 124 is securely mounted a plate 128 which is reinforced by reinforcing member 126, 126', and 127', and which has parallel spaced brackets 129 and 129' on the outer face thereof. A supporting arm 130 comprises a horizontal arm member 130a rigidly connected to the brackets 129 and 129', a vertical arm member 130b having a lower end rigidly connected to the free end of the horizontal arm member 130a, an additional horizontal arm member 130c having one end rigidly connected to the upper end of the vertical arm member 130b. Each of the arm members 130a, 130b and 130c is of a substantially circular form in cross-section. The arm members 130a and 130b ar reinforced by a reinforcing plate 133 as particularly shown in FIG. 10 while the arm members 130b and 130c are also reinforced by a reinforcing plate 134 as particularly shown in FIG. 9. A fluid-operated cylinder 137 is supported on brackets 135 and 136 securely mounted on the rear portion of the base member 103 and has a piston rod 137a the leading end of which is attached to a rack 138 meshed with the pinion gear 123 fixed on the lower end of the stationary post 118. The stroke of the piston rod 137a is previously set so as to turn the cylindrical member 124 by 180°. When the fluid-operated cylinder 137 is thus actuated to cause the piston rod 137a to project and retract, the cylindrical member 124 is turnable around the axis thereof. Where desired, any turn angles may be selected without limiting the previous turn angle if the stroke of the piston rod 137a is approximately varied.

Figure 11:
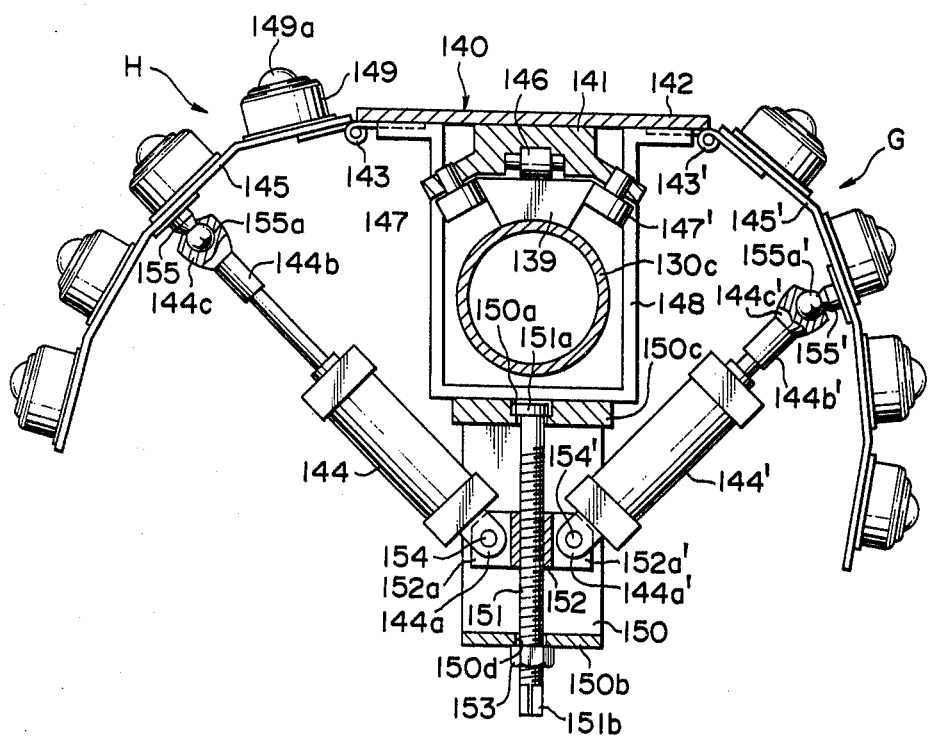
FIG. 11 is an enlarged front view of a portion in the vicinity of tire band holding means of the second embodiment.

As particularly shown in FIG. 11, on the arm member 130c of the supporting arm 130 is securely mounted a guide member 139 which extends longitudinally of the arm member 130c and has an inversely trapezoidal cross-section, however, the lower surface of the guide member 139 being formed having a curvature substantially the same to that of the peripheral surface of the arm member 130c. Tire band holding means, generally indicated at 140, includes a sliding member 141 slidably movable along and on the guide member 139 by means of a roller 146, a central plate 142 securely mounted on the guide member 139, a pair of supporting members 145 and 145' having opposite inner ends swingably hinged as at 143 and 143' to the both sides of the central plate 142. The roller 146 is rotatably mounted on the lower portion of the sliding member 141 which has at the lower portion thereof a pair of projections 141a and 141a' rotatably supporting cam followers 147 and 147', respectively. The cam followers 147 and 147' are adapted to be pressedly engaged with the side surfaces of the guide members 139 so that the central plate 141 is movable exactly in parallel with the axis of the arm member 130c without any traverse jolting. In the vicinity of and rearwardly of the sliding member 141 is attached to the lower surface of the central plate 142 a box-shaped member 148 which houses the arm member 130c and the guide member 139. A number of spherical free rollers 149a are freely rotatably held by holders 149 which are secured to the outer surfaces of the supporting members 145 and 145' so that a tire band is easily moved in parallel with axis of the arm member 130c for facilitating removal and mounting of the tire band from and onto the tire band holding means 140. The numbe of the free roller 149a is determined depending upon the easiness of removal and mounting of the tire band. On the lower wall of the box-shaped member 148 is securely mounted a fixed bracket 10 which has an upper portion 150c formed with a dove-tail groove 150a and a lower portion 150b formed with a bore 150d in opposing relation with the dove-tail groove 150a. An adjusting screw rod 151 is inserted through the bore 150d and has a head 151a engaged with the dove-tail groove 150a to as to be rotatable about its own axis. The screw rod 151 has a lower end formed with square faces 151b which are coupled with a square cut bore of a manually operable suitable handle (not shown) for rotation of the screw rod 151. A nut 153 is threaddedly engaged with the lower portion of the screw rod 151 for clamping the screw rod 151 to the bracket 150. A movable bracket 152 is in threaded engagement with the longitudinally intermediate portion o the screw rod 151 between the lower portion 150b and the upper portion 150c of the fixed bracket 150 so that rotation of the screw rod 151 causes the movable bracket 153 to move upwardly or downwardly along the screw rod 151. A pair of grooves 152a and 152a' are formed symmetrically at the sides of the movable bracket 152. A pair of fluid-operated cylinders 144 and 144' have respective bottom projections 144a and 144a' which are received in the grooves 152a and 152a', respectively, and pivotally connected to the movable bracket 152 through pin members 154 and 154', respectively. The piston rods 144b and 144b' of the fluidoperated cylinders 144 and 144' are journally engaged with spherical portions 155a and 155a', respectively, of brackets 155 and 155' which are, in turn, rigidly connected to the inner walls of the supporting members 145 and 145', respectively. As seen in FIG. 6, the reference numeral 42a and 42b designate positions where there are provided a pair of the mechanisms one of which has been described to include the brackets 155, 155', the fluid-operated cylinders 144, 144', the fixed brackets 150, 150', the movable bracket 152 and the screw rod 151. When the fluid-operated cylinders 144 and 144' are thus simultaneously actuated to cause the piston rod 144b and 144b' to protect and retract, the supporting members 145 and 145' are caused to rotate about the hinges 143 and 143' so that the supporting members 145 and 145' assume a senenth operating position G as shown in the right half of FIG. 11 and in phantom lines of FIG. 8 or the eighth operating position H as shown in the left half of FIG. 11 and in phantom lines of FIG. 8. On the other hand, if the screw rod 151 is rotated by a suitable handle to move the movable bracket 152 upwardly and downwardly, the expanded and collapsed curvatures of the supporting members 145 and 145' are easily adjusted for supporting different size tire bands T.

Figure 12:
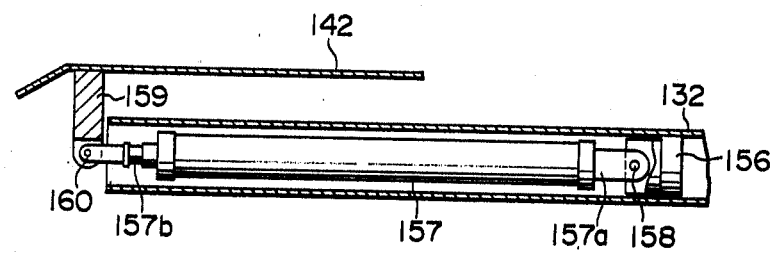
FIG. 12 is a cross-sectional view of an arm member of the second embodiment and shows a fluid-operating cylinder for moving a central plate of the tire band holding means.
Figure 13:
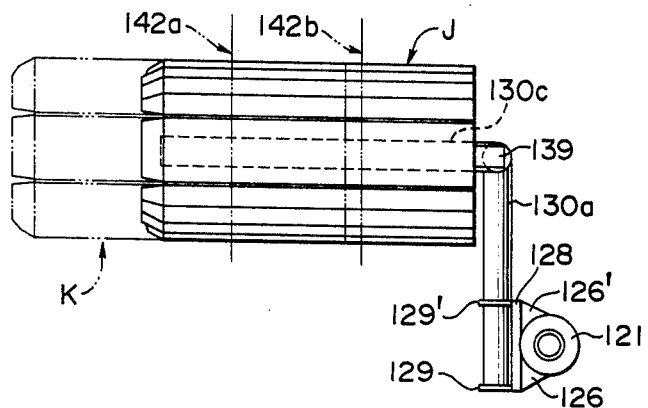
FIG. 13 is a plan view of the tire band holding means of the second embodiment.
Figure 14:
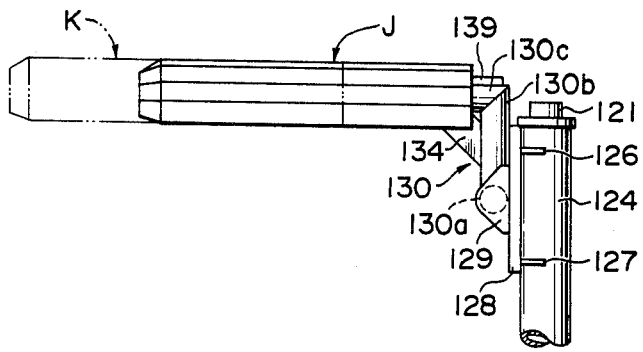
FIG. 14 is a fragmentary side view of a portion in the vicinity of the tire band holding means of the second embodiment.
Figure 15:
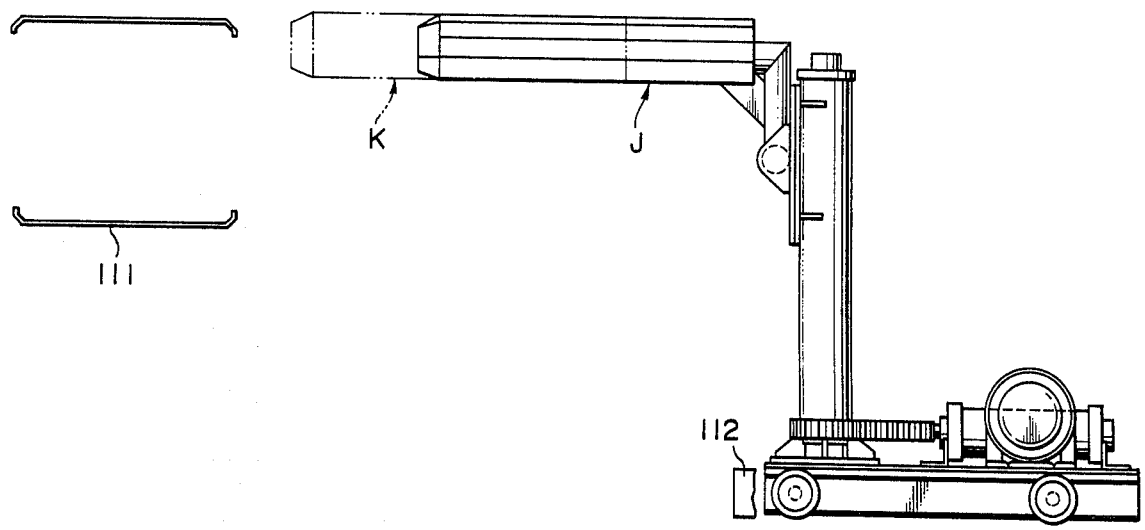
FIG. 15 is a side elevational view of the second embodiment and shows a final operating position of the second embodiment.

As particularly shown in FIG. 12, a fluid-operated cylinder 157 is accommodated in the arm member 130c and has a bottom projection 157a which is pivotally connected through a pivotal pin 158 to a fixed block 156 secured to the inner wall of the arm member 130c. The piston rod 157b of the fluid-operated cylinder 157 has a leading end which is pivotally connected through a pivotal pin 160 to a projection 159 formed in the forward lower surface of the central plate 142. When the fluid-operated cylinder 157 is thus to cause the piston rod 157b to project and retract, the central plate 42 and the supporting members 145 and 145' are movable along the guide member 139 so that the tire band holding means 140 is movable from a tenth operating position J as shown in solid lines in FIGS. 13, 14 and 15 and in phantom lines in FIG. 8 to a final operating position K as shown in phantom lines in FIGS. 8, 13, 14 and 15 and vice versa. On the other hand, the actuation of the fluid-operated cylinder 137 causes the tire band holding means 140 to turn assuming a nineth operating position I as shown in solid lines in FIG. 8 and the tenth operating position. The above sliding of the tire band holding means 140 is performed in order to diminish the turning radius of the tire band holding means 140 for producing a better working condition and putting the operators into much safer.

The operation of mounting a tire band in the above second embodiment of the apparatus in accordance with the present invention will now be described with reference to FIGS. 8 to 15.

The tire band T which is removed from the tire band building drum 11 and mounted on the tire band supporting rods 57 and 57' on the truck 1 in a previously described first embodiment of the present invention is mounted on the tire band holding means 140, during which the free rollers 149a facilitates the mounting operation of the tire band T. At this time, the fluid-operated cylinders 144 and 144' are maintained in conditions having the piston rods 144b and 144b' kept retracted so that the supporting members 145 and 145' are held in the seventh operating position G as shown in phantom lines in FIG. 8 and in the right half of FIG. 11. As soon as the tire band T is mounted on the tire band holding means 140, the fluid-operated cylinders 144 and 144' are actuated to cause the piston rod 144b and 144b' to project so that the supporting members 145 and 145' are swung to assume the eighth operating position H as shown in solid lines in FIG. 8 and in the left half of FIG. 11, resulting in the tire band T held in a condition as shown in phantom lines in FIG. 10. Upon completion of the swinging movement of the supporting members 145 and 145', the electric motor 113 starts to rotate and the truck 101 is driven by the rear wheels 108 and 108' through the sprocket wheel 114, the endless chain 116 and the sprocket wheel 115 so that the truck 101 runs along the guide rails 112 and 112' and approches to the tire building drum 111 to cause the tire band holding means 140 to assume the nineth operating position I as shown in solid lins in FIG. 8 away from the eighth operating position H as shown in phantom lines in FIG. 8. Following the advancement of the tire band holding means 140 to the ninth operating position I, the fluid-operated cylinder 137 is actuated to cause the cylindrical member 124 to turn about its own axis by 180° so that the tire band holding means 140 turns to assume the tenth operating position J as shown in phantom lines in FIG. 8 from the ninth operating position as shown in solid lines in FIG. 8. Thereafter, the fluid-operated cylinder 157 is actuated to cause the piston rod 157b to project forwardly so that the tire band holding means 140 slides forwardly assuming the final operating position K as shown in phantom lines in FIGS. 8 and 15 away from the tenth operating position J as shown in phantom lines in FIG. 8 and in solid lines in FIG. 15. While the tire band holding means 140 being held in the final operating position K and in close proximity of the tire building drum 111, the tire band T is pulled out of the holding means 140 and transferred onto the tire building drum 111 by an attendant operator. At this stage, the operator easily pulls the tire band T out of the tire band holding means 140 and transfers it onto the tire band building drum 111 since the free rollers 149a are freely rotated. After the tire band T has been completely transferred onto the tire band T, the tire band holding means 140 is restored to the seventh operating position G in a entirely reverse operational order.

The above single cycle of operation is repeated to transfer a number of tire bands T onto the tire building drum 111 from the tire band building drum 11 by the trucks 1 and 101. Assuming that the electric motor 113 and the fluid-operated cylinders 137, 144, 144' and 157 are controlled in accordance with a previously set program, the second embodiment may be fully automatically operated. While it has been described that the tire band T is firstly transferred onto the supporting rods 157 and 157' from the tire band building drum 11 and secondly transferred onto the tire band holding means 140 from the supporting rods 57 and 57' for mounting it onto the tire building drum 111, only the truck 101 may be employed to transfer the tire band T from the tire band building drum 11 to the tire building drum 111 without using the truck 1, where desired. The above trucks 1 and 101 may be used independently or jointly to remove a finished green tire built on the tire building drum 111 therefrom and then to transfer it to a vulcanizing process.

From the foregoing description, it will be appreciated that the apparatus according to the present invention obviates the laborious and tiresome removal and loading operation which has thus far been necessitated in the tire band and tire transferring operation, thereby resulting in increased production efficiency and cost-down for a finished tire as well as in extremely excellent tire quality.

While certain representative embodiments and details have been shown for the purpose of explaining the present invention, it will be apparent to those skilled in the art that various changes and modifications may be made without departing from the spirit or scope of the present invention.

What is claimed is:

1. A tire component transferring apparatus comprising:
   a truck movable toward and away from a collapsible building drum;
   drive means mounted on said truck to move said truck toward and away from said building drum;
   an upstanding post assembly mounted on said truck;
   a pair of tire component supporting rods mounted on said upstanding post assembly to be revolvable around a portion of the circumferential outer surface of said building drum, said tire component supporting rods being insertable through a gap formed between a tire component and said building drum held in a collapsed state and then revolved upward to support said tire componenet for removing said tire component from said tire building drum while being revolved downward for releasing therefrom and mounting said tire component on said building drum held in the collapsed state; and
   revolving means mounted on said upstanding post assembly to revolve said tire component supporting rods around said portion of the circumferential surface of said building drum in opposite directions.

2. A tire component transferring apparatus as set forth in claim 1, wherein said tire component supporting rods are each tapered toward the forward end thereof and rotatable around its own axis.

3. A tire component transferring apparatus as set forth in claim 1, wherein said upstanding post assembly is mounted on said truck to be turnable around its own axis, and which further comprises turning means mounted on said truck for turning said upstanding post assembly around its own axis.

4. A tire component transferring apparatus as set forth in claim 3, wherein said upstanding post assembly includes a stationary post substantially vertically and securely mounted on said truck, an inner cylindrical member turnably mounted on said stationary post, an outer cylindrical member substantially vertically slidably engaged with said inner cylindrical member, a first shaft substantially horizontally and rotatably mounted on the upper portion of said outer cylindrical member and having a bore extending throughout the entire length thereof, a second shaft inserted through said bore of said first shaft and rotatably mounted on said first shaft, a first swing arm rigidly connected to one end of said first shaft and having a free end supporting one of said tire component supporting rods, and a second swing arm rigidly connected to one end of said second shaft and having a free end supporting said remaining tire component supporting rod, a plurality of actuators mounted on said inner cylindrical member and each having a leading end pivotally connected to said outer cylindrical member, and wherein said turning means includes a driven spur gear fixedly mounted on the lower portion of said inner cylindrical member, a driving spur gear in mesh with said driven spur gear, and a drive source having a driving connection with said driving spur gear.

5. A tire component transferring apparatus as set forth in claim 4, wherein said revolving means includes a pair of pinion gears mounted on the other ends of said first and second shafts, a pair of racks each meshing with said pinion gear and movably supported by at least an extension formed on the upper portion of said outer cylindrical member, and an actuator having a leading end connected to said racks.

6. A tire component transferring apparatus as set forth in claim 1, which further comprises an additional truck movable toward and away from said truck and an aditional building drum; drive means mounted on said additional truck to move said additional truck toward and away from said truck and said additional building drum; an additional upstanding post assembly turnably mounted on said additional truck; turning means mounted on said additional upstanding truck for turning said additional post assembly; a supporting arm rigidly mounted on and extending from said additional upstanding post assembly; tire component holding means mounted on said supporting arm and including a central plate member and a pair of arcuate supporting members swingably connected to the sides of said central plate; and collapsing means mounted on said supporting arm for swinging said supporting members into collapsed and expanded states.

7. A tire component transferring apparatus as set forth in claim 6, wherein said central plate of said tire component holding means is projectably and retractably mounted on said supporting arm, and which further comprises an actuator mounted on said supporting arm having a leading end connected to said central plate.

8. A tire component transferring apparatus as set forth in claim 6, wherein said supporting members of said tire component holding means each has an outer peripheral wall rotatably retaining a number of free rollers.

9. A tire component transferring apparatus as set forth in claim 6, wherein said collapsing means includes a plurality of actuators mounted on said supporting arm and each having leading ends connected to each of said supporting members for swinging said supporting member into collapsed and expanded states.

10. A tire component transferring apparatus as set forth in claim 9, wherein said actuators each consists of an air cylinder having a piston rod the leading end of which is connected to each of said supporting members, and which further comprises a slide bracket slidably attached to said supporting arm and pivotally supporting the bottoms of said air cylinders to vary the curvature of said supporting members.

11. A tire component transferring apparatus comprising: a truck movable toward and away from a building drum; drive means mounted on said truck to move said truck toward and away from said building drum; an upstanding post assembly turnably mounted on said truck; turning means mounted on said truck for turning said post assembly; a supporting arm rigidly mounted on and extending from said post assembly; tire component holding means mounted on said supporting arm and including a central plate member and a pair of arcuate supporting members swingably connected to the sides of said central plate; and collapsing means mounted on said supporting arm for swinging said supporting members into collapsed and expanded states.

12. A tire component transferring apparatus as set forth in claim 11, wherein said central plate of said tire component holding means is projectably and retractably mounted on said supporting arm, and which further comprises an actuator mounted on said supporting arm having a leading end connected to said central plate.

13. A tire component transferring apparatus as set forth in claim 11, wherein said supporting members of said tire component holding means each has an outer peripheral wall rotatably retaining a number of free rollers.

14. A tire component transferring apparatus as set forth in claim 11, wherein said collapsing means includes a plurality of actuators mounted on said supporting arm and each having leading ends connected to each of said supporting members for swinging said supporting member into collapsed and expanded states.

15. A tire component transferring apparatus as set forth in claim 14, wherein said actuators each consists of an air cylinder having a piston rod the leading end of which is connected to each of said supporting members, and which further comprises a slide bracket slidably attached onto said supporting arm and pivotally supporting the bottoms of said air cylinders to vary the curvature of said supporting members.

* * * * *

UNITED STATES PATENT AND TRADEMARK OFFICE
CERTIFICATE OF CORRECTION

PATENT NO. : 4,039,365

DATED : August 2, 1977

INVENTOR(S) : Y. Takasuga et al

It is certified that error appears in the above-identified patent and that said Letters Patent is hereby corrected as shown below:

On the title page:

Item [30] Foreign Application Priority Data should read:

| Dec. 25, 1974 | Japan | 50-3687 |
| Apr. 2, 1975 | Japan | 50-40561 |

Signed and Sealed this

Thirty-first Day of December 1985

[SEAL]

Attest:

DONALD J. QUIGG

Attesting Officer

Commissioner of Patents and Trademarks